United States Patent [19]

Mullins

[11] 4,324,270

[45] Apr. 13, 1982

[54] REFRIGERANT LINE SERVICE VALVE

[76] Inventor: John W. Mullins, P.O. Box 20524, Oklahoma City, Okla. 73120

[21] Appl. No.: 176,217

[22] Filed: Aug. 7, 1980

[51] Int. Cl.$^3$ .................................................. F16L 41/04
[52] U.S. Cl. .................................................. 137/317
[58] Field of Search .................. 137/315, 317, 318; 251/319, 320, 321; 285/197, 198, 199; 222/510

[56] References Cited

U.S. PATENT DOCUMENTS

| | | | |
|---|---|---|---|
| 2,281,604 | 5/1942 | Smith | 251/321 |
| 3,428,075 | 2/1969 | Wagner | 137/318 |
| 3,548,861 | 12/1970 | Mullins | 137/318 |
| 3,554,217 | 1/1971 | Ehrens et al. | 137/318 |
| 3,675,896 | 7/1972 | Mercier | 251/321 |
| 3,901,268 | 8/1975 | Mullins | 137/318 |

Primary Examiner—George L. Walton

Attorney, Agent, or Firm—Robert K. Rhea

[57] ABSTRACT

A centrally bored and counterbored valve body is secured at one end to a refrigerant line. The line connected end of the valve body contains a normally closed valve core having a stem spring biased to close the valve core. The other end of the valve body contains a mandrel moveable toward and away from the valve core stem for opening and closing the latter. The mandrel contained end of the valve body is surrounded by a cap, containing a sealing ring, manually moved threadedly on the valve body for biasing the mandrel against the valve core stem to open position and sealing with the adjacent end of the valve body. At least one refrigerant outlet service valve is connected with the valve body through a valve body lateral port communicating with the valve body counterbore surrounding the mandrel.

5 Claims, 4 Drawing Figures

REFRIGERANT LINE SERVICE VALVE

BACKGROUND OF THE INVENTION

1. Field of the Invention.

The present invention relates to service valves and more particularly to a service valve for connection with a refrigerant line to provide access to refrigerant contained by the line.

Most sealed refrigerating systems are now provided with an access valve connected with the refrigerant line for access to the refrigerant when sevicing the system, however, it is usually desirable to have more than a single access valve connected with the refrigerant line for the purpose of simultaneously connecting a pressure gauge to the refrigerant line and add or remove refrigerant while the pressure gauge is in communication with the refrigerant line.

This invention provides a normally closed valve which, when connected with the refrigerant line at the time of manufacture or added later, provides a manually operated plunger for opening the refrigerant line connected valve to provide communication with a refrigerant control valve and an open valve housing.

2. Description of the prior art.

The most pertinent prior patent is believed my U.S. Pat. No. 3,548,861 which provides a centrally bored and counterbored housing connected at one end to a refrigerant line and provided with a refrigerant line piercing core moved axially in the housing by a cap on its other end for piercing the line and providing communication therewith through lateral ports to opposing outlet valves communicating with the lateral ports. In this patent the lateral port connected valves have refrigerant pressure against the valves at all times.

This invention is disinctive over prior art patents and my above named patent by providing a valve body connected at one end with a refrigerant line and having a normally closed depressible valve core in its refrigerant connected end portion which is opened and closed by a mandrel contained by the other end of the body which is axially moved toward and away from the valve core by a cap screw threaded on the end of the body opposite the line. A lateral bore, intermediate the ends of the body, communicate with an outlet valve and an open valve housing connected with the body.

SUMMARY OF THE INVENTION

A generally cylindrical centrally bored and counterbored body is connected at one end with a refrigerant line. Adjacent its refrigerant connected end portion, the body bore is provided with a seat receiving a spring biased depressible valve core which normally closes the bore of the body. The outwardly projecting end of the body coaxially receives slidably a mandrel having an inner end portion capable of opening the valve core. The mandrel is moved toward the valve core in a valve core opening action by a cap threadedly engaged with the outwardly projecting end of the body. Packing, such as an O-ring, contained by the cap, seals with the adjacent end of the body and mandrel when the mandrel is biased toward the valve core and opens the latter. A lateral bore in the body, intermediate its ends, communicates with the mandrel containing counterbore. A refrigerant outlet valve and an open valve housing are coaxially connected with the lateral bore thus providing communication through the outlet valve and open valve housing when the valve core is in open position.

The principal object is to provide a closed refrigerating system service valve having a body adapted for connection with a refrigerant line, and having a normally closed valve core opened by a mandrel manually biased toward the valve core for opening the latter and providing communication with one or more outlet valves communicating with the valve core through a lateral body bore.

DESCRIPTION OF THE PREFERRED EMBODIMENTS

Figure 1:
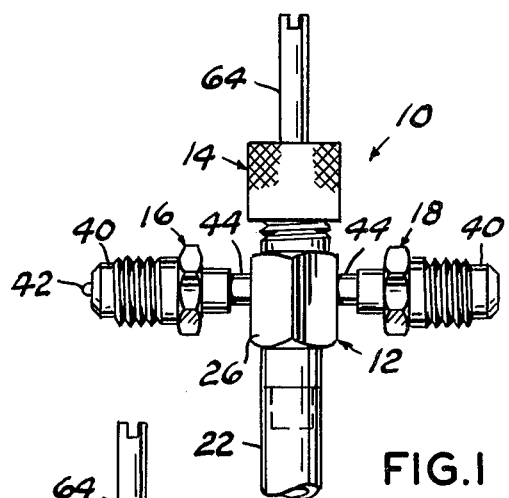
FIG. 1 is an elevational view of the valve connected with a fragment of a refrigerant line.

Like characters of reference designate like parts in those figures of the drawings in which they occur.

In the drawings:

The reference numeral 10 indicates the valve which is substantially cross shaped in side elevation comprising a body portion 12, a cap 14 and lateral outlet valves 16 and 18. The body 12 is generally cylindrical characterized by a step diameter diametrically reduced end portion 20 for axial connection with an end portion of a refrigerant line 22. The body is provided with external threads 24 at its opposite end portion and wrench flats 26 intermediate its ends. The body 12 is axially bored, as at 28, and step diameter counterbored from its threaded end, as at 30 and 32. The counterbore 30 forms a valve seat and the body is internally threaded, as at 34, adjacent the valve seat 30 for receiving a spring biased closed conventional air valve core 36 which seals with the seat 30, for the purposes presently explained.

The body is transversely bored, as at 38, adjacent the juncture of the counterbore 32 with the threads 34, with the bore 38 intersecting the counterbore 32. The transverse bore 38, at its respective end portions, receives one end portion of the outlet valves 16 and 18 for providing communication between these valves and the refrigerant line 22 through the air core valve 36, as presently explained.

The outlet valves 16 and 18 are preferably of the type described by my U.S. Pat. No. 3,336,936 generally comprising a substantially cylindrical housing 40 which is centrally bored or counterbored to provide a seat which receives and seals with an air core 42 threadedly engaged within one end of the housing 40 while the opposite end portion of the housing 40 is diametrically reduced to form a tube 44 having its free end portion secured, as by soldering, to the body 12 within the respective end portions of the bore 38. The core 42 is removed from the valve 18 to leave the housing 40 open. Obviously, the bore 38 may extend only through one side of the body 12 thus eliminating the outlet valve 16, if desired.

The body counterbore 32 coaxially and slidably receives a mandrel 50 having an outwardly disposed end portion 52 closely received slidably by the counterbore 32 and having a diametrically reduced opposite end portion 54 normally contacting, at its free end 56, the stem 58 of the air valve core 32. The mandrel normally extends from the stem 58 beyond the cap covered body end surface a distance equal with the length of axial movement of the stem in opening the valve core.

The cap 14 is substantially conventional with air valve caps characterized by a socket 60 in one end portion which is internally threaded for engagement with the body threads 24 and includes a resilient seal, such as an O-ring 62, interposed between the inner limit of the socket and adjacent end of the body. The cap 14 is further characterized by an elongated coaxial stem opposite the socket opening which is bifurcated, at its free end 66, for installing or removing the air valve core 36.

Figure 4:
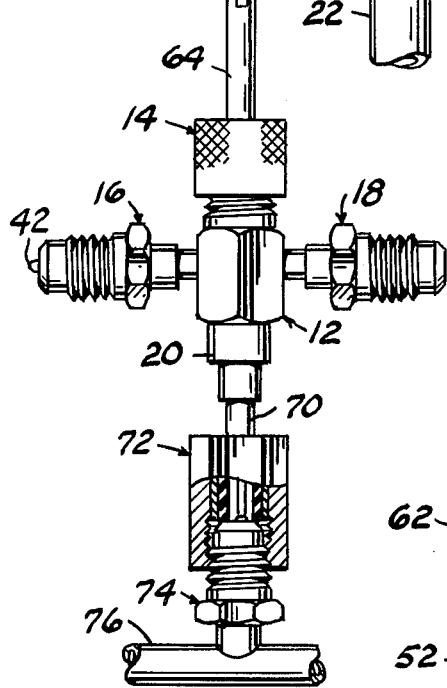

Referring more particularly to FIG. 4, the diametrically reduced end portion 20 of the body 12 may be coaxially connected with the stem 70 of a conventional valve core depressor unit 72 which is in turn connected with an existing conventional refrigerant line access valve 74 communicating with a refrigerant line 76 intermediate its ends.

OPERATION

Figure 3:
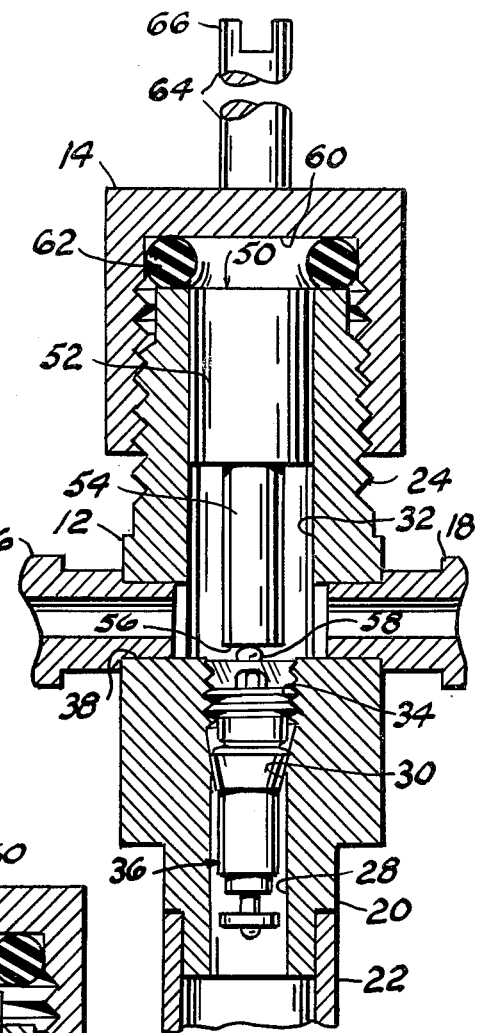
FIG. 3 is a fragmentary cross sectional view, similar to FIG. 2, illustrating the valve open position; and, FIG. 4 is an elevational view, similar to FIG. 1, partially in section, illustrating an alternative embodiment.
Figure 2:
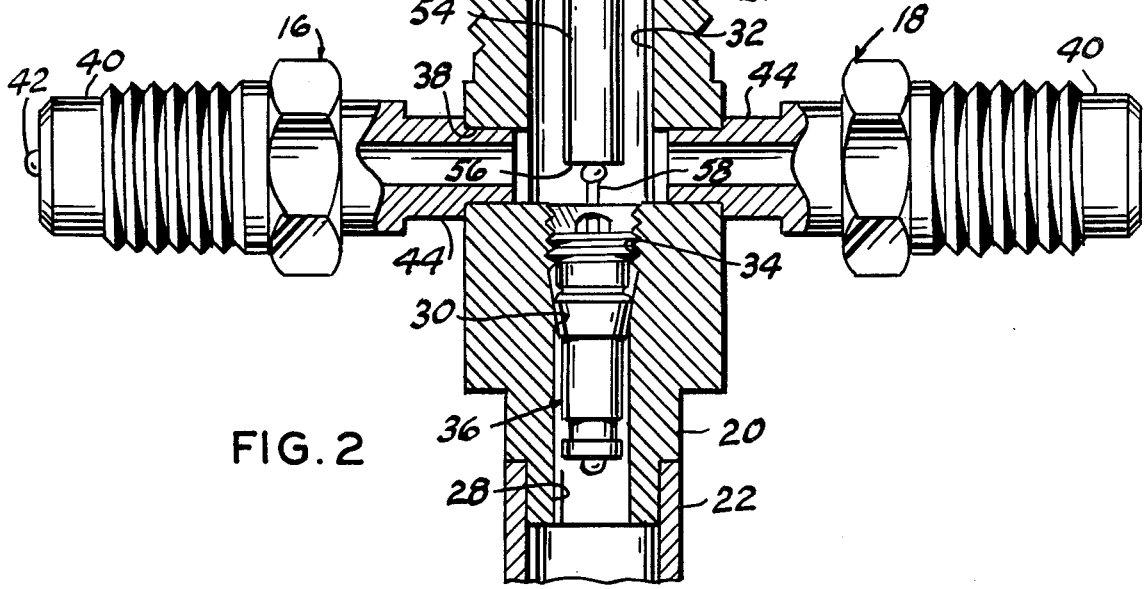
FIG. 2 is a fragmentary vertical cross sectional view, to an enlarged scale, partially in elevation, of FIG. 1 with the valve in closed position.

In the operation of the embodiment shown by FIGS. 1 through 3, the valve 10 is connected with the refrigerant line 22 and the valve cap 14 is normally loosely connected with the threads 24 so that the air core valve 36 remains closed and prevents communication between the refrigerant line 22 and either of the outlets 16 or 18.

When the refrigerant system needs service, a pressure gauge and a refrigerant supply, neither of which are shown, are respectively connected with the outlets 18 and 16 and the cap 14 is manually screwed down so that the resilient seal 62, contacting the mandrel end portion 52 and simultaneously sealing with the adjacent end of the body, axially moves the mandrel 50 so that its end 56, in contact with the valve core stem 58, depresses the stem to open the valve 36 and provide communicatin between the refrigerant line 22 and the outlets 16 and 18.

After servicing the refrigerant system by removing or adding refrigerant, the cap 14 is again manually loosened to permit the spring urged air valve core stem 58 to lift the mandrel 50 and close the air valve core 36.

In the embodiment illustrated by FIG. 4, threadedly engaging the depressor unit 72 with the service valve 74 opens the latter providing communication between the refrigerant line 76 and the bore 28 of the housing 12. Thereafter, operation of the alternative embodiment is substantially identical to that described above.

Obviously the invention is susceptible to changes or alterations without defeating its practicability. Therefore, I do not wish to be confined to the preferred embodiment shown in the drawings and described herein.

I claim:

1. A service valve for a refrigerant line, comprising:
   a generally cylindrical axially bored body having external threads at one end portion and having its other end portion secured to and communicating with a refrigerant line,
      said body having a valve seat in its said other end portion and having a counterbore in its said one end portion terminating outwardly of the valve seat and having a lateral bore intersecting the counterbore adjacent the inner limit of the counterbore;
   body bore valve means seated on said valve seat and normally closing the body bore;
   mandrel means axially movable in the counterbore for opening said valve means;
   cap means engaged with said external threads for moving said mandrel toward said body bore valve means; and,
   at least one refrigerant outlet means connected with said body for communication with the counterbore through the lateral bore, and said mandrel and said valve means being perpendicular to the axis of said lateral bore and being adjacent to said outlet means at all times during the opening and closing of said valve means.

2. The service valve according to claim 1 in which said body bore valve means includes an air valve core having a depressible spring biased closed stem normally projecting axially into the counterbore.

3. The service valve according to claim 2 in which said mandrel means includes:
   a mandrel having a length slightly greater than the spacing between said stem and the end surface of said body one end portion,
      said mandrel having one end portion closely received by and projecting axially out of the counterbore a distance at least equal with the length of axial movement of said stem between its depressed valve core open and spring biased valve core closed positions,
      said mandrel having its other end portion diametrically reduced and abutting the adjacent end of said stem.

4. The service valve according to claim 1 or 3 in which said cap means includes:
   a cap normally loosely engaged with said external threads; and,
   resilient seal means within said cap for contacting the adjacent end of said mandrel and sealing with the adjacent end surface of said body when said cap is threadedly moved toward said body other end portion.

5. The service valve according to claim 1 or 3 and further including:
   a refrigerant service valve depressor unit axially connected with said body other end portion.

* * * * *